United States Patent
Giebelhaus et al.

(10) Patent No.: US 10,836,857 B2
(45) Date of Patent: Nov. 17, 2020

(54) POLYESTER-MODIFIED AMINO ADDUCTS

(71) Applicant: BYK-Chemie GmbH, Wesel (DE)

(72) Inventors: Irina Giebelhaus, Wesel (DE); Andreas Okkel, Wesel (DE); Wolfgang Pritschins, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 84 days.

(21) Appl. No.: 16/333,847

(22) PCT Filed: Sep. 11, 2017

(86) PCT No.: PCT/EP2017/072698
§ 371 (c)(1),
(2) Date: Mar. 15, 2019

(87) PCT Pub. No.: WO2018/050582
PCT Pub. Date: Mar. 22, 2018

(65) Prior Publication Data
US 2019/0263964 A1    Aug. 29, 2019

(30) Foreign Application Priority Data
Sep. 16, 2016 (EP) ..................... 16 002018

(51) Int. Cl.
| | |
|---|---|
| *C08G 63/685* | (2006.01) |
| *C08G 63/664* | (2006.01) |
| *C08K 5/17* | (2006.01) |
| *C09D 167/04* | (2006.01) |
| *C08G 63/64* | (2006.01) |

(52) U.S. Cl.
CPC ......... *C08G 63/6852* (2013.01); *C08G 63/64* (2013.01); *C08G 63/664* (2013.01); *C08K 5/17* (2013.01); *C09D 167/04* (2013.01)

(58) Field of Classification Search
CPC .............. C08G 63/6852; C08G 63/664; C09D 167/04; C08K 5/17
See application file for complete search history.

(56) References Cited

U.S. PATENT DOCUMENTS

| | | |
|---|---|---|
| 4,777,195 A | 10/1988 | Hesse et al. |
| 4,795,796 A | 1/1989 | Haubennestel et al. |
| 5,130,463 A | 7/1992 | Haubennestel et al. |
| 5,143,952 A | 9/1992 | Saheki et al. |
| 6,111,054 A | 8/2000 | Haubennestel et al. |
| 9,574,121 B2 | 2/2017 | Omeis |
| 2003/0120029 A1* | 6/2003 | Shalaby ............. A61L 31/06 528/310 |
| 2015/0299538 A1 | 10/2015 | Omeis et al. |
| 2017/0190840 A1 | 7/2017 | Gobelt et al. |

FOREIGN PATENT DOCUMENTS

| | | | |
|---|---|---|---|
| EP | 417490 B1 | 5/1996 | |
| EP | 0893155 B1 | 4/2004 | |
| EP | 2 780 391 | * 3/2015 | ........... C08G 63/685 |
| EP | 2780391 B1 | 3/2015 | |
| JP | 63012335 A | 1/1988 | |
| JP | 11197485 A | 7/1999 | |
| JP | 2014533749 A | 12/2014 | |
| WO | 2012030600 A2 | 3/2012 | |
| WO | WO 2012/030600 A2 | * 3/2012 | |
| WO | 2015079033 A | 6/2015 | |
| WO | 2015079033 A1 | 6/2015 | |

OTHER PUBLICATIONS

Database WPI Week 198808, Derwent World Patents Index; AN 1988-054666, XP002674118.
International Search Report and Written Opinion for International Patent Application No. PCT/EP2017/072698 dated Nov. 16, 2017.

* cited by examiner

*Primary Examiner* — Robert D Harlan
(74) *Attorney, Agent, or Firm* — Fitch, Even, Tabin & Flannery, LLP

(57) ABSTRACT

The invention relates to processes for producing an amine adduct in which in a 1st step a polyamine (A) is reacted with a monomer (C) in the form of an epoxide, an oxetane or a cyclic carbonate to afford an (intermediate) product (AC) which in a subsequent 2nd step is reacted with a monomer (B) in the form of a lactone, an acyclic hydroxycarboxylic acid or a hydroxy-functional acyclic ester to afford a (descendant) product (ACB), wherein the polyamine (A) in each case comprises at least three amino groups (A+) selected from primary and secondary amino groups and each capable of reaction with the monomers (C) and (B), the monomer (C) contains no ester groups, no carboxyl groups and no primary or secondary amino groups and in the 1st step with ring opening and formation of a hydroxyl group (H+) reacts with one of the amino groups (A+) of the polyamine (A) with additional formation of either a carbon-nitrogen bond or a urethane bond, the monomer (B) contains no primary or secondary amino groups, has a molecular weight of 90-300 g/mol and in the 2nd step reacts in such a way that any amino groups (A+) not converted in the 1st step are converted into amide groups and hydroxyl groups (H+) formed in the 1st step are converted into ester groups, wherein the monomer (B) is chosen in such a way that either in the conversion thereof a terminal hydroxyl group (H++) is additionally formed or that the monomer (B) itself already has a terminal hydroxyl group (H++) and that via the terminal hydroxyl groups (H++) with formation of (poly) ester groups a further addition of the monomer (B) is effected, wherein the process parameters are chosen such that in the 1st step and in the 2nd step altogether at least 50 mol % of the amino groups (A+) are converted.

19 Claims, No Drawings

POLYESTER-MODIFIED AMINO ADDUCTS

The present invention relates to a process for preparing an amine adduct, to the amine adduct and also to use thereof, and to a paint and/or plastic.

Wetting agents, present in solution or dispersion in a liquid, lower the surface tension or interfacial tension and so increase the wetting capacity of the liquid. In many cases it is only in this way, through wetting agents, that surface wetting is made possible at all.

Dispersants are suitable in general for stabilizing particulate solids in binders, paints, pigment pastes, plastics and plastics blends, adhesives, and sealants, for reducing the viscosity of such systems, and also for improving the flow properties. Dispersion stabilizers are used in order to stabilize dispersions that have already been produced.

In order to be able to introduce solids into liquid media, high mechanical forces are required. It is customary to use dispersants in order to lower the dispersing forces and in order to minimize the overall input of energy into the system that is needed in order to deflocculate the particulate solids, and hence also to minimize the dispersing time. Such dispersants are surface-active substances of anionic, cationic and/or neutral structure. These substances in small amounts are either applied directly to the solid or added to the dispersing medium. It should be borne in mind that even after full deflocculation of the agglomerated solids into primary particles (after the dispersing operation), there may be instances of reagglomeration, thereby wholly or partly bringing the dispersing effort to naught. Typical consequences of inadequate dispersing and/or of reagglomeration are unwanted effects, such as viscosity increase in liquid systems, shade drift and loss of gloss in paints and in coatings, and reduction in mechanical strength and in the homogeneity of the material in plastics.

A variety of types of compound are suitable in practice as wetting agents and dispersants. The reason for this in particular is that there are a large number of different systems based, in particular, on different kinds of binders, in combination with particles having different dispersal qualities, such as pigments, fillers, and also fibers.

EP-B-2 780 391 concerns the use of specific amine adducts in paints and plastics. Said amine adducts feature a polyamine core on which polyester groups are bonded via salt bonds or amide bonds, and hydrocarbon groups are bonded via carbon-nitrogen bonds. The polyesters are prepared in a separate step by polymerization reaction from monocarboxylic acids and hydroxycarboxylic acids or their lactones. In this way, linear monofunctional polyesters are obtained which contain a carboxyl group at one end of the chain and an alkyl group at the other end. There are no hydroxyl groups in these polymers. The amine adducts are then prepared by addition reaction of these polyesters and an epoxide compound onto the polyamine. This polyester addition is presumed to occur primarily on the readily available amino groups in the outer region of the polyamines. Particularly in the case of the highly branched polyamines of relatively high molecular mass, the amino groups in the core region are presumed to be no longer available for forming amides with the acid groups of the polyesters. In general, therefore, these adducts, as well as acid groups, also contain primary or secondary amino groups that are still reactive and that may cause unwanted stability problems in certain applications, owing to secondary reactions. The reaction with the epoxides is also accompanied by the formation of OH groups, which are localized in the region of the amine core. In these polyamine adducts there are generally no OH groups at the ends of the polyester chains.

While such dispersants are indeed suitable in principle for dispersing solids, they are of only limited universality in relation, in particular, to the solids to be dispersed, and this limits their suitability for different dispersing tasks. For example, if particularly large amounts of inorganic solids are to be incorporated into liquid systems, as in the case of the dulling of solvent-free paints with silica-based matting agents, the viscosity reductions achievable with these dispersants are often not sufficient to incorporate the requisite amounts of solids.

The object on which the present invention was based, therefore, was that of providing a process for producing high-quality dispersant additives that can be employed as universally as possible and that do not have the above-stated disadvantages and, in particular, permit good reductions in viscosity in the case of highly filled systems.

This object is achieved by a process for preparing an amine adduct, wherein in a $1^{st}$ step a polyamine (A) is reacted with a monomer (C), in the form of an epoxide, an oxetane or a cyclic carbonate to form an (intermediate) product (AC) which, in a subsequent $2^{nd}$ step, is reacted with a monomer (B), in the form of a lactone, an acyclic hydroxycarboxylic acid or a hydroxy-functional acyclic ester, to form a (downstream) product (ACB), wherein the polyamine (A) has in each case at least three amino groups (A+) which are selected from primary and secondary amino groups and which in each case are reactive with the monomers (C) and (B), the monomer (C) contains no ester groups, no carboxyl groups, and no primary or secondary amino groups, and in the $1^{st}$ step reacts with ring opening and also formation of a hydroxyl group (H+) with one of the amino groups (A+) of the polyamine (A), with additional formation of either a carbon-nitrogen bond or a urethane bond, the monomer (B) contains no primary or secondary amino groups, has a molecular weight of 90-300 g/mol, and reacts in the $2^{nd}$ step in such a way that any amino groups (A+) unreacted in the $1^{st}$ step are converted into amide groups, and hydroxyl groups (H+) formed in the $1^{st}$ step are converted into ester groups, wherein the monomer (B) is selected such that either reaction thereof is accompanied by additional formation of a terminal hydroxyl group (H++) or that the monomer (B) itself already possesses a terminal hydroxyl group (H++) and that via the terminal hydroxyl groups (H++), with formation of (poly)ester groups, there is further adduction of the monomer (B), wherein the process parameters are selected such that in the $1^{st}$ step and in the $2^{nd}$ step in total at least 50 mol % of the amino groups (A+) are converted.

The polyamine (A), the monomer (B), and the monomer (C) may each be composed of different species, i.e., may each also be present as mixtures.

The mole-percentage conversion of the amino groups (A+) is measured by determination of the amine number according to DIN 16945 (see register of methods in the experimental section).

Key process parameters relevant to the conversion of at least 50 mol % of the amino groups (A+) are the stoichiometry of the components used and the reaction conditions (e.g., temperature and reaction time).

The amine adduct of the invention is normally in the form of a (technical) crude product, which may optionally include solvents, byproducts, and unreacted starting components, and also other "impurities". The (downstream) product (ABC) and/or modifications thereof that are elucidated hereinafter forms and/or form the main component of the amine adduct.

The process has the particular feature that the intermediate product (AC) is employed in practice as a kind of "macroinitiator" in order, for example, to initiate the addition reaction of the hydroxycarboxylic acids or, for example, the ring-opening polymerization of the lactones. In this way, in practice two types of polyester chains are formed, each carrying a hydroxyl group at the chain end and differing in the nature of the bond to the polyamine: these chains are bonded either via an amide bond to the original amino groups (A+) or via an ester bond to the OH groups (H+) formed from the addition of monomer (C). Because the amidation reaction of the amino groups (A+) proceeds more rapidly than the esterification of the OH groups (H+), the "polyester chain initiation" initially takes place preferentially at the amino groups.

The amine adducts of the invention have a zero or very low acid number, whereas the comparable products (e.g., those according to EP-B-2 780 391) generally have a significant, higher acid number, pointing to a correspondingly incomplete reaction of the carboxyl-functional polyesters. The acid number of the amine adduct of the invention is generally below 40, preferably below 20, more preferably below 10, and very preferably below 5 mg KOH/g.

The amine-initiated, ring-opening polyester formation according to the invention is considerably quicker than the carboxyl-initiated polymerization known accordingly. This is possibly one reason why with the process of the invention it is possible to obtain higher-quality products with high efficacy and reduced preparation effort. The products obtained by the process of the invention display improved storage stability, reduced tendency toward crystallization, and enhanced compatibility with the usual solvents and binders. Because of the typically very substantial or even, ideally, complete conversion of the reactive amino groups, fewer secondary reactions triggered by reactive amines are triggered, such as the yellowing of light-colored formulations (which occurs especially in the case of formulations containing nitrocellulose). Generally speaking, the products of the invention display a broad compatibility with a large number of binders and solvents. Moreover, the resultant viscosity of dispersions of solids is lower, allowing higher solids concentrations.

Drawdowns and rub-outs of various solids show high gloss, low flocculation, and no bittiness, The monomer (C) is preferably in the form of an epoxide, and so the monomer (C) reacts in the $1^{st}$ step, with ring opening and also formation of a hydroxyl group (H+), with one of the amino groups (A+) of the polyamine (A), with additional formation of a carbon-nitrogen bond.

The monomer (C) typically contains exclusively the elements carbon, hydrogen, and oxygen, and has no hydroxyl groups.

Particularly if the monomer (C) is present in the form of an epoxide, it has a maximum of three oxygen atoms, preferably precisely one oxygen atom, and 6 to 70, preferably 6 to 32, carbon atoms.

A number of less than 6 carbon atoms frequently produces too high a polarity, whereas more than 70 carbon atoms usually impairs the universal compatibility. Monomer (C) frequently contains a total of 6 to 24 carbon atoms and additionally a maximum of three heteroatoms from the group of the elements O, N, P, S, Si. Heteroatoms other (than those just stated) are preferably absent according to the invention.

Monomer (C) preferably has in each case precisely one linking group and contains preferably no further functional groups which react in the course of the reaction with the polyamine component (A).

The monofunctionality reduces the tendency toward crosslinking, which usually leads to poor solubility, poor compatibility, and excessive viscosities.

In one specific embodiment of the invention, the monomer (C) comprises at least 30 wt %, preferably 50 to 100 wt %, of unsaturated $C_6$-$C_{50}$ monomers which each have at least one aryl and/or alkylaryl group.

Aromatic groups frequently endow the products with particularly good adsorption capacity on numerous particle surfaces.

According to one particular variant of the invention, the monomer (C) comprises at least 30 wt %, preferably 50 to 100 wt %, of $C_{10}$-$C_{70}$ monomers which each contain at least one branched alkyl radical and/or branched alkenyl radical. Branched groups often give rise to better solubility and in general promote the universal compatibility.

Examples of epoxy-functional compounds suitable as monomer (C) include aliphatic, cycloaliphatic and/or aromatic glycidyl ethers, glycidyl esters and olefin oxides such as $C_1$-$C_{20}$ alkyl glycidyl ethers, phenyl glycidyl ethers, cresyl glycidyl ethers, naphthyl glycidyl ethers, butyl glycidyl ethers, p-tert-butylphenyl glycidyl ethers, 2-ethylhexyl glycidyl ether, $C_{12}$-$C_{14}$ glycidyl ethers, allyl glycidyl ether, 2,3-epoxypropyl neodecanoate (Cardura® E 10, Resolution Performance Products), C4-C28 olefin oxides such as 1,2-octene oxide, 1,2-nonene oxide, 1,2-undecene oxide, 1,2-dodecene oxide, 1,2-octadecene oxide, 4-methyl-1,2-pentene oxide, styrene oxide, butadiene monoxide, isoprene monoxide, cyclopentene oxide and/or 2-ethyl-1,2-butene oxide. Monofunctional epoxies are preferred.

Oxetanes with suitability as monomer (C), besides the unsubstituted oxetane, are alkyl, aryl and hydroxyalkyl derivatives thereof, such as 3-ethyl-3-(phenoxymethyl)oxetane and 3-ethyl-3-(hydroxymethyl)oxetane, 3-ethyl-3-(2-ethylhexyloxymethyl)oxetanes, 3-methyl-3-(hydroxymethyl)oxetanes, and ethylhexyl oxetanes, and also derivatives thereof with ethoxylation and/or propoxylation on the hydroxyl group, having 1-20 ethylene oxide units and/or propylene oxide units, which may be disposed randomly, in blocks or in the manner of a gradient.

The reaction of the polyamines with the epoxides and oxetanes produces a secondary or primary hydroxyl group and, on the nitrogen atom involved in the reaction, a secondary or tertiary amino group.

Likewise suitable as monomer (C) are cyclic alkylene carbonates having 5- or 6-membered rings, which may optionally be substituted. Suitable substituents are aliphatic, cycloaliphatic and/or aromatic groups having up to 30 carbon atoms. Suitable cyclic carbonates are, for example, ethylene carbonate, propylene carbonate, glycerol carbonate, 5-methyl-5-propyltrimethylene carbonate, trimethylene carbonate, 4-methyltrimethylene carbonate, 5-methyltrimethylene carbonate, 5,5-dimethyltrimethylene carbonate or 5,5-diethyltrimethylene carbonate. Preferred are ethylene carbonate, propylene carbonate, and glycerol carbonate.

The addition of the component (C) onto the polyamine (A) is expediently accomplished with controlled metering through slow addition of component (C) to the initial charge of polyamine (A), so that the reaction temperature of preferably 80 to 140° C. is not exceeded.

The components (A), (B), and (C) are preferably used each in stoichiometric proportions such that in total at least 50 mol %, preferably 70 to 100 mol %, more preferably 100%, of the entirety of the reactive amino groups (A+) in the polyamine compounds (A) used are reacted with the monomer (B) and the monomer (C).

Corresponding conversions of less than 50% usually denote products having a large number of reactive amino groups, which tend toward unwanted secondary reactions. As a consequence, instances of product discoloration, reduced pot life, and impaired storage stability are often posted.

Monomer (B) normally takes the form of one or more, optionally alkyl-substituted, hydroxycarboxylic acids such as hydroxycaprylic acid, ricinoleic acid or 12-hydroxystearic acid and/or their corresponding cyclic lactones, such as propiolactone, valerolactone or caprolactone. The monomer (B) is preferably in the form of a lactone, so that reaction thereof therefore results additionally in a terminal hydroxyl group (H++). The lactone polymerization is carried out by known processes, catalyzed by, for example, Brønsted acids (e.g., p-toluenesulfonic acid, methanesulfonic acid) or organotin compounds (e.g., dibutyltin dilaurate, dibutyltin diacetate), at temperatures of about 50° C. to 200° C. Typically the monomer (B) is in the form of a lactone, which then is usually in the form of caprolactone, valerolactone and/or butyrolactone. Particularly preferred are ε-caprolactone and δ-valerolactone and mixtures thereof.

In one preferred embodiment of the invention, the reaction of precisely one species of monomer (B) produces a maximum of 2 ester groups, preferably precisely one ester group, in the (downstream) product (ACB).

Usually the monomer (B) is selected such that in the (downstream) product (ACB) there are exclusively aliphatic polyester groups formed, each having precisely one terminal OH group.

Monomer (B) is usefully used as far as possible in amounts such that besides all of the reactive amino groups (A+) there are also at least 50%, preferably 100%, of the OH groups formed by addition of monomer (C) that are converted.

Examples of suitable polyamine compounds (A) are aliphatic linear polyamines, such as diethylenetriamine (BETA), triethylenetetramine (TETA), tetraethylenepentamine (TEPA), pentaethylenehexamine, hexaethyleneheptamine, and higher homologs, higher linear condensates of the general formula $NH_2$—$(C_2H_4NH)_n$—$C_2H_4$—$NH_2$ with n>5, dipropylenetriamine, (3-(2-aminoethyl)aminopropylamine, N,N-bis(3-aminopropyl)methylamine, tetramethyliminobispropylamine, N,N-dimethyldipropylenetriamine, bis(3-dimethylaminopropyl)amine, and N,N'-bis(3-aminopropyl)ethylenediamine.

Employed typically are aliphatic branched polyamines, especially poly($C_2$-$C_4$)alkylenamines, having primary, secondary, and tertiary amino groups. Particularly suitable are the aziridine homopolymers known under names including polyethyleneimine, such as, for example, the Lupasol® products from BASF or the Epomin® products from Nippon Shokubai. They are prepared by known processes, such as by the polymerization of ethyleneimine, for example.

In the organic polyamine compounds (A), the molar ratio of primary to secondary amino groups is in each case usually 2:1 to 1:5 and the molar ratio of primary to tertiary amino groups is usually in each case 3:1 to 1:3.

Primary amines are more reactive than secondary amines, and so a low proportion of primary amines may imply a low reactivity in relation to the synthesis reaction.

Tertiary amino groups typically cause good adsorption to surfaces of solids, and also a low tendency to enter into secondary reactions. Moreover, the tertiary amino groups enable structures of high molecular mass, but with the viscosity nevertheless remaining comparatively low.

A low molar mass frequently causes weak adsorption to the surface of the solid, whereas a high molar mass may be problematical in relation to handling and solubility.

Besides unmodified polyamines, it is also possible to use partly modified polyamines, as described in EP 0 893 155. These modified polyamines may be, for example, condensates of the above-described polyamines with carboxylic acids such as stearic acid, oleic acid or tall oil fatty acid, for example, which are joined to the polyamine via amide moieties. It is also possible for parts of the primary or secondary polyamine to be reacted with monoisocyanates, such as stearyl isocyanate, and/or polyisocyanates. Preference is given to using unmodified polyamines.

Another suitable class of polyamines are homopolymers, copolymers or block copolymers having at least three primary or secondary amino groups, which are preparable either by radical or anionic polymerizations, or are formed by means of a polymer-analogous reaction on an already preformed polymer or are inserted into such a polymer. These homopolymers, copolymers or block copolymers possess a weight-average molecular weight of up to 1 000 000 g/mol, preferably of 600 to 200 000 g/mol. Said polyamines can be used individually or in a mixture.

Another group of suitable polyamines are the reaction products, described as intermediate product PA in WO 2015/079033, of amines with polyfunctional linking components containing 2 to 6 reactive groups.

The polyamine (A) usually has no hydroxyl groups, has a molecular weight of 200 to 1 000 000 (determined by GPC according to DIN 55672-1, 55672-2 or 55672-3), and also at least 4, preferably at least 8, amino groups (A+).

With particular preference the polyamine (A) has a molecular weight of 300 to 100 000 (method of determination: GPC) and comprises at least one, preferably two, more preferably four, and very preferably six tertiary amino groups, and also no further elements other than carbon, hydrogen, and nitrogen, and is present with particular preference in the form of polyethyleneimine.

The polyamine (A) is normally used in relation to the monomer (C) in a weight ratio of 1:0.1 to 1:100, preferably of 1:0.2 to 1:10, more preferably 1:0.5 to 1:5.

In one particularly preferred embodiment of the invention, the procedure is such that in particular monomer (B) is used relative to monomer (C) in a molar ratio such that after the end of the $2^{nd}$ step a maximum of 5%, preferably a maximum of 1%, of the hydroxyl groups present in the (downstream) product (ACB) are present in the form of hydroxyl groups (H+) formed in the $1^{st}$ step. This is determined by measuring the OH number after each reaction stage (method description in the experimental section).

In this way, influence over the positions of the hydroxyl groups within the (downstream) product (ACB) is applied in a controlled way. In a model-based scenario, it might be supposed that—viewed statistically—positions of the hydroxyl groups are moved from the "inner region" into the "outer region" of the polymer, hence achieving an increased "hydroxyl group density" in the "outer region" of the polymer, Typically the monomer (B) is used in relation to the monomer (C) in a molar ratio of 500:1 to 1:1, preferably of 1001 to 51.

Normally the process parameters are selected such that at least 50 mol % of the amino groups (A+) are already converted by step 1 and a total of at least 70 mol % of the amino groups (A+) are converted by step 1 and step 2. With preference all the amino groups (A+) are converted by steps 1 and 2.

Usefully 1 to 100 mol, preferably 3 to 50 mol, and more preferably 5 to 20 mol of monomer (B) are used per amino group (A+).

In general predominantly or exclusively the only reaction components used are polyamine (A), monomer (C), and monomer (B), so that the (downstream) product (ACB), based on its own mass, contains a total of at least 80 wt %, preferably at least 95 wt %, of structural elements from the group of reacted polyamine (A), reacted monomer (C) and reacted monomer (B).

The $2^{nd}$ step is carried out after the $1^{st}$ step is completely at an end.

The $1^{st}$ step and the $2^{nd}$ step are usefully each carried out at temperatures below 175° C.

The basic groups give the amine adducts the capacity to form salts. These adducts in the sense of the invention can be used in the form of the corresponding salts, as well, as dispersants. In some cases it is possible by such partial or complete salification to achieve an improvement in the activity and/or an improved solubility or compatibility. In applications where the basicity of the products is a disrupting factor, as for example in acidically catalyzed systems, partial or complete neutralization may also frequently enable improvements to be achieved.

The salts are obtained from the resultant reaction product by neutralization with one or more organic or inorganic acids or by quaternization. The amount of acid to be used is guided by the field of employment. On a case-by-case basis, the acid components may be used in equimolar, in deficit or in surplus proportions. Of polycarboxylic acids it is also possible, for example, to use up to one equivalent of polycarboxylic acid per basic group to be neutralized, in order to give the products an acidic character. Neutralization is preferably carried out equimolarly. Preferred salts are those with organic carboxylic acids or acidic phosphoric esters. Examples of such acidic phosphoric esters are recited in EP 893 155, EP 417 490, and U.S. Pat. No. 5,143,952. Examples of carboxylic acids are aliphatic and/or aromatic carboxylic acids such as short-chain or long-chain fatty acids, formic acid, acetic acid, neodecanoic acid, oleic acid, tall oil fatty acid, stearic acid, ricinoleic acid, natural saturated or unsaturated vegetable or animal fatty acids and their maleic anhydride adducts, maleic acid, fumaric acid, succinic acid, dodecenylsuccinic acid, 5-norbornene-2,3-dicarboxylic acid, adipic acid, glutaric acid, benzoic acid, nitrobenzoic acid, phthalic acid, tetrahydrophthalic acid, isophthalic acid, terephthalic acid, dimerized or trimerized fatty acids, citric acid, and abietic acid.

The compounds of the invention, depending on viscosity, can be prepared in bulk or in the presence of suitable solvents, solvent mixtures or other suitable carrier media. Suitable solvents or carrier media are all those which under the reaction conditions selected are not reactive or whose reactivity toward the reaction partners is negligible, and in which the reactants and the reaction products are at least partly soluble. These include, for example, hydrocarbons such as toluene, xylene, aliphatic and/or cycloaliphatic benzine fractions, chlorinated hydrocarbons such as chloroform, trichloroethane, cyclic and acyclic ethers such as dioxane, tetrahydrofuran, polyalkylene glycol dialkyl ethers such as dipropylene glycol dimethyl ether, esters of mono-, di- or polycarboxylic acids such as ethyl acetate, butyl acetate, butyrolactone, dimethyl 2-methylglutarate, triacetin, phthalates or other plasticizers, dicarboxylic or polycarboxylic esters, dialkyl esters of $C_2$-$C_4$ dicarboxylic acids referred to as "Dibasic Esters", alkylglycol esters such as ethylglycol acetate, methoxypropyl acetate, ketones such as methyl isobutyl ketone, cyclohexanone, acetone, acid amides such as dimethylformamide, N-methylpyrrolidone, and the like. The solvent or solvents and/or carrier media are usefully selected with a view to the planned field of employment. For compounds of the invention for use in water-thinnable paint systems or for the coating of pigments in aqueous suspension after the pigment synthesis, for example, preference is given to using solvents which are wholly or partly dilutable with water. Where, for example, the products are to be used in scenarios where the presence of volatile organic compounds (VOCs) is unwanted, the formulation ought as far as possible to be solvent-free or to be present in carrier materials which are deemed correspondingly to be VOC-free.

Depending on the field of application, the solvents used for the synthesis may remain in the reaction mixture or they are wholly or partly removed and replaced, optionally, by other solvents or carrier media.

The solvent may be removed, for example, by distillation, optionally under reduced pressure and/or azeotropically with addition of water, removal being entire or partial. The active substance may alternatively be isolated by precipitation through addition of nonsolvents such as aliphatic hydrocarbons, hexane for example, subsequent separation by filtration, and optionally drying. The active substance obtained by one of these methods can then be partially dissolved in a solvent suitable for the particular field of application, or optionally used in pure form, in the case of powder coatings, for example, or put onto inert carriers. For applications preferring the use of solids, such as powder coatings or certain plastics processing techniques, the compounds may also be converted into a solid form by means of further known methods. Examples of such methods are microencapsulation, spray drying, adsorption onto a solid carrier such as $SiO_2$, or the PGSS process (Particles from Gas Saturated Solutions). If possible, the products are preferably produced without solvents.

The invention also relates to an amine adduct which is preparable by the above-described process, the procedure being such that, in particular, monomer (B) is used relative to monomer (C) in a molar ratio such that after the end of the $2^{nd}$ step there is a maximum of 5%, preferably a maximum of 1%, of the hydroxyl groups present in the (downstream) product (ACB) in the form of hydroxyl groups (H+) formed in the $1^{st}$ step.

The amine adduct of the invention generally has an average molecular weight of 1500 to 100 000, preferably 3000 to 80 000, and more preferably 5000 to 50 000 (determined by GPC according to DIN 55672).

The amine number according to DIN 16945 of the amine adducts of the invention is usefully in the range of 5 to 200 mg KOH/g, preferably 10 to 100 mg KOH/g, and more preferably not more than 50 mg KOH/g.

The hydroxyl number of the amine adducts of the invention is usefully in the range of 5 to 200 mg KOH/g, preferably 10 to 100 mg KOH/g, and more preferably not more than 50 mg KOH/g—for the method of determination, see the register of methods—hereinafter.

The present invention further relates to the use of the above-described amine adduct, or of the amine adduct preparable by the above-described process, as an additive, preferably in coatings, especially in paints, in plastics, in pigment pastes, in sealants, in cosmetics, in ceramics, in adhesives, in encapsulants, in pigment-containing compositions of flatscreen technology, in filling compounds, in printing inks, and in liquid inks, preferably in paints.

In the context of this use, the amine adduct is employed preferably as a wetting and dispersing agent.

Lastly, the present invention also relates to a paint and/or plastic which comprises the above-described amine adduct.

The amine adducts of the invention find use, for example, as an aluminum passivator, dispersant, dispersion stabilizers or wetting agent, and can be employed, for example, in pigmented and/or filler-containing products, examples being pigment concentrates or pastes, coating compositions, sealants, plastics, ceramics, cosmetics, adhesives, encapsulants, filling compounds, printing inks and/or liquid inks. Preferred pigment concentrates are those that can be mixed with corresponding letdown systems to produce pigmented paints.

They may be used, for example, in the production or processing of paints, printing inks, liquid inks, for inkjet printing, for example, papercoating, leather and textile colorants, pastes, pigment concentrates, ceramics, adhesives and sealants, encapsulants, plastics, and cosmetic preparations, particularly if these systems comprise solids such as pigments and/or fillers. They can also be used in the production or processing of molding compounds based on synthetic, semisynthetic or natural macromolecular compounds, such as polyvinyl chloride, saturated or unsaturated polyesters, polyurethanes, polystyrenes, polyacrylates, polyamides, epoxy resins, polyolefins, such as polyethylene or polypropylene. For example, the compounds may be used for producing encapsulants, casting compounds, PVC plastisols, gelcoats, polymer concrete, circuit boards, industrial coating materials, coating materials for wood and for furniture, vehicle paints, marine paints, anticorrosion paints, can coatings and coil coatings, or decorating and architectural paints.

The amine adducts of the invention can be used not only in letdown systems for pigmented paints. Likewise possible is their use in a wide range of formulations or products, such as resins, oils, greases, lubricants, rubber materials, sealants, printing inks, liquid inks, adhesives, waxes or coating material compositions. Concentrates may also be employed in formulations which are produced in the bodycare industry, or in electrical applications, such as the production of batteries, and in the electronics industry, as for example in the production of EMCs (Epoxy Molding Compounds), for encapsulating semiconductors in integrated circuits, in the marine industry, within medical applications, in the building industry, in petroleum extraction, e.g., in the case of drilling muds, or in the automobile industry. Examples include electronic paper, such as the display in e-books, the encapsulation of microelectronic chips and circuit boards, submarine skin coatings, such as antifouling coatings, silicone tubes or lubricity additives for braking components.

The amine adducts of the invention can also be used advantageously in the production of color filters for liquid-crystal displays, liquid-crystal screens, color resolution devices, sensors, plasma screens, SED-based displays (Surface conduction Electron emitter Displays), and for MLCCs (Multi Layer Ceramic Compounds). The MLCC technology is employed in the production of microchips and circuit-boards.

Examples of possible uses in cosmetic products include the production of cosmetic preparations such as makeup, powders, lipsticks, hair colorants, creams, nail varnishes, and sun protection products. These products may be present in the usual forms—for example as W/O or O/W emulsions, solutions, gels, creams, lotions or sprays. The compounds of the invention can be used advantageously in dispersions that are used for producing these preparations. These dispersions may include carrier media that are customary for this purpose in cosmetology, such as water, castor oils or silicone oils, and solids, such as organic and inorganic pigments, such as titanium dioxide or iron oxide.

Other fields of application that may be mentioned include NIP (Non impact printing), inkjet (on paper, film, ceramic, artificial and natural fiber fabric), dispersing of ceramics (aqueous or water-free), dispersing in encapsulants. The amine adducts of the invention may also be used as they are, in other words without having been incorporated beforehand into a corresponding concentrate, in the aforementioned formulations and areas of application.

The product comprising amine adducts and also pigments and/or fillers is typically a paint, or a pigment concentrate for coating compositions. Ultimately, however, the amine adducts can be employed in any desired pigment-containing and/or filler-containing products.

The pigment concentrates are, in particular, compositions which as well as the amine adducts of the invention comprise, for example, organic solvents and at least one pigment. These compositions contain, in particular, no or low fractions of organic polymers as binders. Such known binders are advantageously present in the corresponding letdown systems, and are described hereinafter.

Organic solvents employed include in particular the typical organic solvents known to the skilled person and used within the sector of the paint and varnish industry, such as aliphatic solvents, cycloaliphatic solvents, aromatic solvents, such as toluene, xylene, solvent naphtha, ethers, esters and/or ketones, examples being butyl glycol, butyl diglycol, butyl acetate, methyl isobutyl ketone, methyl ethyl ketone, and/or solvents, such as methoxypropyl acetate, diacetone alcohol.

Pigments employed are the pigments known to the skilled person. Examples of pigments are mono-, di-, tri-, and polyazopigments, oxazine, dioxazine, and thiazine pigments, diketopyrrolopyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone and perylene pigments, and other polycyclic carbonyl pigments, and inorganic pigments, such as carbon black pigments and/or pigments based on carbon black, graphite, zinc, titanium dioxide, zinc oxide, zinc sulfide, zinc phosphate, barium sulfate, lithophone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate-molybdate yellow or chromium titanium yellow), magnetic pigments based on pure iron, iron oxides and chromium oxides or mixed oxides, metallic effect pigments composed of aluminum, zinc, copper or brass, and also pearlescent pigments or fluorescent and phosphorescent pigments. Further examples are nanoscale organic or inorganic solids with particle sizes below 100 nm in at least one dimension, such as certain grades of carbon black or other allotropic forms of carbon, such as single-wall CNTs, multi wall CMTs, and graphene. The particle size is determined by means, for example, of transmission electron microscopy, analytical ultracentrifugation or methods of light scattering. Likewise deserving of mention are particles which consist of a metal or semimetal oxide and/or hydroxide, and also particles consisting of mixed metal and/or semimetal oxides and/or hydroxides. It is possible, for example, to employ the oxides and/or oxide hydroxides of aluminum, of silicon, of zinc, of titanium, etc., for producing such extremely finely divided solids. The operation of producing these oxidic and/or hydroxylic and/or oxide-hydroxylic particles may involve any of a very wide variety of techniques, such as, for example, ion exchange operations, plasma operations, sol-gel processes, precipitation, comminution (by milling, for example) or flame hydrolysis. All of the aforesaid pigments may be in surface-modified forms and may possess basic, acidic or neutral groups on the surface.

Where the respective products, especially the coating compositions, include fillers, the fillers in question are, for example, those known to the skilled person. Examples of fillers in powder or fiber form are, for example, those composed of pulverulent or fibrous particles of aluminum oxide, aluminum hydroxide, silicon dioxide, kieselguhr, siliceous earth, quartz, silica gel, silica, phyllosilicates, bentonites, clay minerals, organoclays, talc, kaolin, mica, perlite, feldspar, slate flour, calcium sulfate, barium sulfate, calcium carbonate, calcite, dolomite, glass or carbon. The fibers used may be organic and/or inorganic in nature and may also be used as reinforcing agents. Other examples of pigments or fillers are found for example in U.S. Pat. No. 4,795,796. Flame retardants as well, where the compounds of the invention are not already used in customary additive amounts for this purpose, such as aluminum hydroxide or magnesium hydroxide, may also be mentioned in this context.

The dulling of low-solvent and solvent-free systems, such as, for example, 100%, UV-curing paints and varnishes, is usually a difficult task. Matting agents used are predominantly precipitated silicas, silica gels, and fumed silicas. The high quantities of matting agent also lead to high viscosities, and hence the quantities needed for greater degrees of dulling can frequently be introduced, if at all, only at the expense of good processing.

The amine adducts of the invention can be employed universally for these types of matting agent, and provide excellent dispersing at the same time as a reduction in the viscosity of the matt coatings. It is therefore possible to increase the amount of matting agent. In this case the orientation of the matting agents is usually also improved, the coatings appear more transparent, sedimentation of the matting agent is reduced, and the additive reduces the foaming that normally occurs, and the additive improves the leveling.

The amine adducts of the invention are also suitable in particular for producing solids concentrates, such as pigment concentrates. For this purpose, the amine adducts of the invention are introduced in a carrier medium such as organic solvents, plasticizers and/or water, and the solids to be dispersed are added with stirring. These concentrates may additionally comprise binders and/or other auxiliaries. With the amine adducts of the invention, however, it is possible in particular to produce stable, binder-free pigment concentrates. It is also possible with the amine adducts of the invention to produce flowable solids concentrates from pigment presscakes. In this case the compound of the invention is admixed to the presscake, which may still comprise organic solvents, plasticizers and/or water, and the resulting mixture is dispersed. The solids concentrates, produced by various pathways, can then be incorporated into a variety of substrates such as, for example, alkyd resins, polyester resins, acrylate resins, polyurethane resins or epoxy resins. Pigments, however, can also be dispersed directly, in solvent-free form, into the amine adducts of the invention, and are then particularly suitable for the pigmentation of thermoplastic and thermosetting polymeric formulations.

Depending on field of use the amine adducts of the invention are used in amounts such that, in the product ultimately of interest for the further application, the fraction of the wetting and dispersing agent of the invention is advantageously from 0.01 to 10 wt %, based on the total amount of the respective product. Higher fractions, however, are also possible.

Based on the solid to be dispersed, the pigment for example, the wetting and dispersing agent of the invention is used in an amount of preferably 0.5 to 100 wt %. Where difficult-to-disperse solids are being used, the amount of wetting and dispersing agent of the invention employed may well be higher. The amount of dispersant is generally dependent on the surface area to be occupied on the substance that is to be dispersed. The particular pigment involved, for example, may also be significant. Generally speaking, the amount of dispersant needed for dispersing inorganic pigments is usually less than for organic pigments, since the latter usually possess a higher specific surface area and, consequently, require a greater amount of dispersant. Typical levels of addition of the wetting and dispersing agent for inorganic pigments are, for example, 1 to 20 wt %, while for organic pigments they are 10 to 50 wt %, based in each case on the solid—more particularly the pigment—to be dispersed. In the case of very finely divided pigments (certain carbon blacks, for example), amounts of 30% to 90% or more need even to be added. As criteria for sufficient pigment stabilization it is possible, for example, to employ gloss and transparency of the coating compositions, or the degree of floating. The solids may be dispersed individually or as a mixture with two or more pigments simultaneously, the best results being generally achievable with single dispersions. Where mixtures of different solids are used, there may be increased incidence of agglomerations in the liquid phase, owing to opposite charges on the surfaces of the solids. In these cases, when the amine adducts of the invention are used, it is often possible to achieve a like charge, generally a positive charge, on all of the particles, and so to prevent instabilities resulting from differences in charge. The dispersants achieve their optimum effect on addition to the millbase, particularly if first of all the solid to be dispersed is mixed only with the additive and any solvents ("premix"), since in that case the additive is able to adsorb preferentially onto the surface of the solid, without having to compete with the binder polymers. In practice, however, this procedure is needed only in exceptional cases. Where necessary, the amine adducts of the invention may also be used subsequently (as so-called "post-additives"), in order, for example, to solve problems of floating or flocculation in a batch that has already been let down. Generally speaking in this case, however, increased levels of additive addition are required.

The products, particularly the coating compositions, or paints and varnishes, in which the amine adducts of the invention are intended ultimately to display their effects may, moreover, comprise an organic polymer as binder. Such binders are known to the skilled person. This at least one binder may be introduced, for example, via a letdown system which is mixed, for example, with a pigment concentrate comprising the amine adducts of the invention, so that the product in question is a pigmented paint. Also possible, however, are other pigments and/or filler-containing products, examples being plastics, sealants, and other products known to the skilled person and based on an organic polymeric matrix. A product is deemed to be a system which comprises a polymeric resin or organic polymer as binder and so is able under suitable curing conditions to form a solid organic, polymeric matrix (a coating composition, for example). Likewise deemed to be a product is a system which is capable, by simple mixing with a component comprising a binder, of forming such an organic, polymeric matrix (a pigment concentrate, for example). Employed for example, but not exclusively, are the alkyd resins, polyester resins, acrylate resins, polyurethane resins, cellulose nitrates, cellulose acetobutyrates, melamines, chlorinated rubbers and/or epoxy resins that are known to the skilled person. Examples of water-based coatings are cathodic or anodic electrocoat systems for automobile bodies, for example. Other examples are renders, silicate paints, emulsion paints, waterborne coatings based on water-thinnable alkyds, alkyd emulsions, hybrid systems, two-component systems, polyurethane dispersions, and acrylate dispersions.

Both 1-component systems and 2-component systems are possible, with a second component in the latter case generally further comprising polyisocyanates, melamine resins and/or polyamide resins as the typical crosslinking agents with which the skilled person is familiar. Preferred product systems, especially coating compositions, are those comprising an acrylate resin as binder. In a further variant, the system in question is a 2-component (2K) coating composition or a 2K paint which comprises an epoxy resin in the binder component and a polyamide resin in the crosslinker component.

The coating compositions preferred as products may be water-based or solvent-based. Water-based means that the coating composition comprises primarily water as its solvent. In particular in the case of a water-based coating composition, not more than 10 wt % of organic solvents are present in the coating composition, based on the total amount of solvents. A solvent-based coating composition is one containing not more than 5 wt %, preferably not more than 2 wt %, of water, based on the total amount of solvents. Solvent-based compositions are preferred.

Examples of further suitable product components include photoinitiators, defoamers, wetting agents, film-forming assistants, such as cellulose derivatives (for example cellulose nitrates, cellulose acetates, cellulose acetobutyrate), reactive diluents, flow control agents, dispersants, and/or rheology control additives.

The coating composition and pigment concentrates preferred as products are produced via the processes familiar to the skilled person. The known methods are employed, such as, for example, the gradual addition with stirring and mixing of the constituents of the coating composition, in customary mixing assemblies, such as stirred tanks or dissolvers.

Using the preferred pigment concentrates and coating compositions, it is possible to produce coatings or paint films. The coating is produced via the application technologies familiar to the skilled person, on a substrate, and by subsequent curing processes.

Application is accomplished, for example, by the known spraying, injecting, spreading, rolling, pouring, impregnating and/or dipping processes. Following the application of the coating composition to a substrate, curing or drying takes place according to commonplace methods. For example, the applied coating composition may be physically drying, thermally curable and/or curable using actinic radiation (radiation-curing), preferably UV radiation, and also electron beams. Thermal curing may be accomplished, for example, in the range from about 10° C. to about 400° C., depending on the nature of the coating composition and/or of the substrate. The duration of curing as well is dependent individually, for example, on the nature of the curing process (thermal or actinic), the nature of the coating composition used, and/or the substrates. The substrate here may be moving or else at rest.

Besides the above-described application as dispersants and/or coating materials for pulverulent and fibrous solids, the amine adducts of the invention may also be used as viscosity reducers and compatibilizers in synthetic resins. Examples of such synthetic resins are those known as sheet molding compounds (SMC) and bulk molding compounds (BMC), consisting of unsaturated polyester resins with high levels of filler and fiber. Their production and processing are described by way of example in U.S. Pat. No. 4,777,195. One problem affecting SMC and BMC synthetic-resin mixtures is that polystyrene (PS) is often added to the formulation in order to reduce the shrinkage during processing. PS is not compatible with the unsaturated polyester resins used, and the components undergo separation. When using PS-filled SMC or BMC mixtures, the amine adducts of the invention, on the basis of their good dispersing qualities, are able to bring about compatibilization between PS and unsaturated polyester resin, thereby increasing the storage stability and processing reliability of such mixtures.

By means of the amine adducts of the invention it is possible to achieve phase mediation effects, for example, in incompatible polyol mixtures, polyol-isocyanate mixtures or polyol-blowing agent mixtures (which are used, for example, in polyurethane production).

WORKING EXAMPLES

In the text below, the invention is illustrated using examples. Unless otherwise declared, the percentages hereinafter are generally weight percentages.

Measurement Methods:

In the case of molecularly nonuniform substances, the reported molecular weights—below as in the description above—represent average values of the numerical mean. The molecular weights or number-average molecular weights ($M_n$) are determined, when determinable functional end groups are present, such as hydroxyl, amino or acid groups, by means of end-group determination, via the ascertainment of OH number, amine number and/or acid number by titration. In the case of compounds for which end-group determination cannot be applied, the number-average molecular weight is determined by gel permeation chromatography against a polystyrene standard (according to DIN 55672).

Solids Content

The sample (2.0±0.1 g of test substance) is weighed out into an aluminum dish which has been dried beforehand, and is dried in a drying cabinet at 150° C. for 10 minutes, cooled in a desiccator, and then reweighed. The residue corresponds to the solids fraction.

OH Number

Alcoholic hydroxyl groups are reacted by acetylation with an excess of acetic anhydride. The excess acetic anhydride is then cleaved by addition of water to give acetic acid, and back-titration takes place using ethanolic KOH. The OH number indicates the amount of KOH in mg which is equivalent to the amount of acetic acid bound in the acetylation of 1 g of substance.

Acid Number

The acid number (AN) refers to the amount of KOH in mg which is needed in order to neutralize 1 g of substance under the specified conditions. The acid number is determined according to DIN EN ISO 2114 by a neutralization reaction with 0.1 N KOH in ethanol as titrant.

Amine Number

The amine number (AmN) refers to the amount of KOH in mg which corresponds to the amine fraction of 1 g of substance. The amine number is determined according to DIN 16945 by a neutralization reaction with 0.1 N perchloric acid in acetic acid as titrant.

Gel Permeation Chromatography (GPC)

The gel permeation chromatography was carried out at 40° C. with a high-pressure liquid chromatography pump (Bischoff HPLC 2200) and a refractive index detector (Waters 419). The eluent used was tetrahydrofuran, with an elution rate of 1 ml/min. Calibration was performed using polystyrene standards. The number-average molecular weight ($M_n$), the weight-average molecular weight ($M_w$), and the polymolecularity index PMI=$M_w/M_n$ were calculated using the NTeqGPC program (according to DIN 55672).

NMR Measurement

The NMR measurements were carried out on a Bruker DPX 300 at 300 MHz ($^1$H). The solvent used was deuterated chloroform (CDCl$_3$).

In the text below, the invention is illustrated using examples. Unless otherwise observed, figures in percent are weight percentages.

Preparation Protocols:

INVENTIVE EXAMPLES

General Preparation Protocol for Intermediate Products AC

A four-neck flask provided with stirrer, thermometer, and nitrogen inlet tube is charged with the stated amount of amine A. With waterbath cooling and with stirring, the stated amount of component C is metered in at a rate such that the temperature does not exceed 100° C. The completeness of the reaction of an epoxide was monitored via $^1$H NMR.

| Ex. | Component A | wt % | Component C | wt % |
|---|---|---|---|---|
| AC1 | PEI 1300 | 60.15 | EHGE | 39.84 General |
| AC2 | PEI 1300 | 61.07 | CGE | 38.92 preparation |
| AC3 | PEI 1300 | 56.73 | NOM | 43.26 protocol for |
| AC4 | PEI 1300 | 91.15 | TMPO | 8.84 products |
| AC5 | PEI 1300 | 82.82 | 3EO-TMPOx | 17.18 ACB |
| AC6 | PEI 1300 | 86.6 | GC | 13.38 |
| AC7 | PEI 300 | 70.98 | EHGE | 29.03 |
| AC8 | PEI 2000 | 59.86 | EHGE | 40.14 |
| AC9 | PEI 1300 | 86.54 | EHGE | 13.45 |
| AC10 | PEI 1300 | 83.28 | NOM | 16.71 |
| AC11 | PEI 1300 | 87.68 | CGE | 12.31 |
| AC12 | PEI 2000 | 61.86 | AlkylGE | 38.14 |

Ex. = Example,
PEI (number) = Polyethyleneimine (MW),
EHGE = Ethylhexyl glycidyl ether,
CGE = o-Cresyl glycidyl ether,
NOM = Neodecanoic acid oxiranylmethyl ester,
TMPOx = 3-Ethyl-3-(hydroxymethyl)oxetane,
3EO-TMPOx = ethoxylated, 3-ethyl-3-(polytri(oxyethylene)hydroxymethyl)oxetane = 3EO-TMPOx,
GC = Glycerol carbonate,
AlkylGE = C12-C14-Alkyl glycidyl ether A four-neck flask provided with stirrer, thermometer, and nitrogen inlet tube is charged with the stated amount of the component AC under N$_2$ atmosphere. The reaction mixture is heated to 80° C. and reacted with approximately ⅓ of the stated amount of component B1. The temperature here is not to exceed 80° C. After approximately one hour, the remaining amount of the component B1, of the catalyst, and optionally of the stated amount of B2 are metered in and the temperature is raised to 170° C. The reaction is monitored via determination of solids content. The reaction is considered to be over when the solids content is >97%.

| Ex. | Component A | wt % | Component B1 | wt % | Component B2 | wt % | Catalyst | wt % |
|---|---|---|---|---|---|---|---|---|
| ACB1 | AC1 | 8.72 | CAPA | 63.42 | VAL | 27.81 | DBTL | 0.006 |
| ACB2 | AC1 | 22.8 | CAPA | 77.19 | | | DBTL | 0.006 |
| ACB3 | AC1 | 12.87 | CAPA | 87.12 | | | DBTL | 0.006 |
| ACB4 | AC1 | 8.14 | CAPA | 91.85 | | | DBTL | 0.006 |
| ACB5 | AC2 | 8.35 | CAPA | 75.82 | VAL | 15.25 | DBTL | 0.008 |
| ACB6 | AC7 | 8.20 | CAPA | 78.09 | VAL | 13.70 | DBTL | 0.005 |
| ACB7 | AC3 | 9.45 | CAPA | 77.04 | VAL | 13.52 | DBTL | 0.005 |
| ACB8 | AC6 | 5.53 | CAPA | 86.85 | VAL | 7.8 | DBTL | 0.007 |
| ACB9 | AC4 | 4.93 | CAPA | 80.86 | VAL | 14.19 | DBTL | 0.007 |
| ACB10 | AC5 | 5.42 | CAPA | 80.46 | VAL | 14.12 | DBTL | 0.007 |
| ACB11 | AC2 | 3.21 | CAPA | 61.06 | VAL | 35.70 | DBTL | 0.005 |
| ACB12 | AC2 | 4.41 | CAPA | 83.39 | VAL | 12.19 | DBTL | 0.005 |
| ACB13 | AC12 | 8.81 | CAPA | 91.18 | | | DBTL | 0.005 |
| ACB14 | AC8 | 7.1 | CAPA | 70.50 | VAL | 22.39 | DBTL | 0.004 |
| ACB15 | AC10 | 5.5 | CAPA | 94.5 | | | DBTL | 0.005 |
| ACB16 | AC9 | 8.5 | CAPA | 62.4 | VAL | 28.9 | DBTL | 0.004 |
| ACB17 | AC11 | 5.4 | CAPA | 94.6 | | | DBTL | 0.004 |
| ACB18 | AC1 | 7.5 | HSA | 92.5 | | | DBTL | 0.004 |
| ACB19 | AC1 | 9.5 | RFA | 90.5 | | | DBTL | 0.004 |

Ex. = Example,
CAPA = epsilon-Caprolactone,
VAL = delta-Valerolactone,
DBTL = Dibutyltin dilaurate,
HSA = Hydroxystearic acid,
RFA = Ricinol fatty acid General Preparation Protocol for Modified Downstream Products ACB@mod A four-neck flask provided with water separator, stirrer, thermometer, and nitrogen inlet tube is charged with the stated amount of the components AC, B1, and optionally B2 under N$_2$ atmosphere. The reaction mixture is heated to 80° C. and the catalyst is added. After approximately two hours, the temperature is raised to 190° C. The reaction is monitored via determination of solids content. The reaction is considered to be over when the solids content is >97%. This is followed by the reaction with component S1 at 150° C.

The completeness of the reaction is monitored by $^1$H NMR and by determination of the acid number.

here were ACY2* vs. ACB3, ACY3* vs. ACB4 and ACB4@mod, and ACB13 vs. ACY4*.

| Ex. | Component AC | wt % S1 | wt % B1 | wt % B2 | wt % | Catalyst | wt % |
|---|---|---|---|---|---|---|---|
| ACB2 @mod | AC1 | 15.71 LA | 31.11 CAPA | 53.18 | — | DBTL | 0.006 |
| ACB4 @mod | AC1 | 7.01 LA | 13.88 CAPA | 79.10 | — | DBTL | 0.006 |

CAPA = epsilon-Caprolactone,
DBTL = Dibutyltin dilaurate

NONINVENTIVE EXAMPLES ACCORDING TO THE PRIOR ART

General Preparation Protocol for Products ACY

A four-neck flask provided with stirrer, thermometer, water separator, and nitrogen inlet tube is charged with the stated amount of component AC and of the polyester component Y under N$_2$ atmosphere. The reaction mixture is heated to 80° C. and reacted with the stated amount of catalyst. After approximately one hour, the temperature is raised to 170° C. The reaction is over when water of reaction is no longer liberated.

| Ex. | Component AC | wt % | Polyester comp. Y | wt % | Catalyst | wt % |
|---|---|---|---|---|---|---|
| ACY1 | AC1 | 15.71 | Y1 | 84.28 | DBTL | 0.006 |
| ACY2 | AC1 | 10.26 | Y2 | 89.73 | DBTL | 0.006 |
| ACY3 | AC1 | 7.01 | Y3 | 92.98 | DBTL | 0.006 |
| ACY4 | AC12 | 7.87 | Y4 | 92.08 | ZB | 0.05 |

Ex. = Example,
DBTL = Dibutyltin dilaurate,
ZB = Zirconium butoxide

General Preparation Protocol for Polyester Components Y

A four-neck flask provided with stirrer, thermometer, reflux condenser, and nitrogen inlet tube is charged with the substances S1 to B2, and this initial charge is heated to 110° C. with stirring under N$_2$ atmosphere. Then the catalyst is added and heating is continued under N$_2$ gas to 190° C. Stirring takes place at this temperature until the SC attained is >=99%.

| Ex. | S1 | wt % | B1 | wt % | B2 | wt % | Catalyst | wt % | M g/mol |
|---|---|---|---|---|---|---|---|---|---|
| Y1 | LA | 31.08 | CAPA | 53.13 | VAL | — | ZB | 0.07 | 542 |
| Y2 | LA | 20.29 | CAPA | 69.38 | VAL | — | ZB | 0.08 | 884 |
| Y3 | LA | 13.87 | CAPA | 79.03 | VAL | — | ZB | 0.08 | 1340 |
| Y4 | HSA | 12.01 | CAPA | 87.98 | VAL | — | ZB | 0.1 | 2412 |

Ex. = Example;
Cat = Catalyst;
LA = Lauric acid;
HSA = Hydroxystearic acid,
RFA = Ricinol fatty acid;
CAPA = epsilon-Caprolactone;
VAL = delta-Valerolactone;
ZB = Zirconium butoxide;
IPT = Isopropyl titanate;

USE EXAMPLES

In the use examples which follow, the use of the inventively employed dispersants was tested in comparison to dispersants which can be used noninventively (labeled (*)), as additives in pigment pastes and in corresponding wood varnish systems. The examples compared with one another Use of the Inventive Polymers as Wetting & Dispersing Additives Performance Testing of the Stabilization of Pigments in Wood Varnish Systems Apparatus:

DISPERMAT CV, DISPERMAT LC3

Andalok shaker Nathalie model

Substances for Performance Testing:

Setal 209 (dispersing binder), short-oil alkyd, Nuplex resins

Synthalat 405 E (letdown binder), short-oil alkyd, Synthopol

Desmophen 1300 (letdown binder), polyester polyol, Covestro

Desmodur HL, aromatic-aliphatic isocyanate, Covestro

Bayferrox 3910, yellow iron oxide, P.Y. 42, Lanxess

Heliogen Blue L7101F, phthalocyanine blue, P.B. 15:4, BASF

Spezialschwarz 4, furnace black, P.BI. 7, Orion engineered Carbons

Procedure:

To produce the pigment concentrates, the specified raw materials, additives, and the pigment were each weighed out in succession into a Dispermat pot (300 ml volume with 4.5 cm Teflon disks). Then glass beads were added 1:1 in weight fractions, and the mixture was dispersed for 60 minutes at a peripheral speed of 21 m/s (4.5 cm Teflon disk) with a DISPERMAT CV, the cooling being set at 40° C.

| Formulation 1: Pigment concentrates based on Heliogen Blue L7101F | | | |
|---|---|---|---|
| | Heliogen Blue L7101F | | |
| Pigment name | Control | Additive (60%) | Additive (100%) |
| Setal 209 SS70 | 42.8 | 38 | 38 |
| Butyl acetates | 40.7 | 37.5 | 40.7 |
| Additives | 0 | 8 | 4.8 |
| BYK Synergist 2100 | 0.5 | 0.5 | 0.5 |
| Pigment | 16 | 16 | 16 |
| Total | 100 | 100 | 100 |
| Additives s.o.p. (%) | | 30 | 30 |

| Formulation 2: Pigment concentrates based on Bayferrox 3910 | | | |
|---|---|---|---|
| | Bayferrox 3910 | | |
| | Control | Additive (60%) | Additive (100%) |
| Setal 209 SS70 | 26.4 | 22.4 | 22.4 |
| Butyl acetates | 33.2 | 30.5 | 33.2 |
| Aerosil R-972 | 0.4 | 0.4 | 0.4 |

-continued

Formulation 2: Pigment concentrates based on Bayferrox 3910

| | Bayferrox 3910 | | |
|---|---|---|---|
| | Control | Additive (60%) | Additive (100%) |
| Additives | | 6.7 | 4 |
| Pigment | 40 | 40 | 40 |
| Total | 100 | 100 | 100 |
| Additives s.o.p. (%) | | 10 | 10 |

Formulation 3: Pigment concentrates based on Spezialschwarz 4

| | Special Black 4 | | |
|---|---|---|---|
| | Control | Additive (60%) | Additive (100%) |
| Setal 209 SS70 | 40.9 | 32.3 | 32.3 |
| Butyl acetates | 41.1 | 35.3 | 41.1 |
| Additives | | 14.3 | 8.6 |
| Pigment | 18 | 18 | 18 |
| Total | 100.0 | 100.0 | 100.0 |
| Additives s.o.p. (%) | | 48 | 48 |

Letdown of the Pigment Concentrates

Procedure:

All of the components were added in succession with stirring to a PE beaker and then homogenized with an Andalok shaker (Nathalie model) for 10 minutes.

| | Pigment name: | | |
|---|---|---|---|
| | Spezial-schwarz 4 | Heliogen Blue 7101F | Bayferrox Yellow 3910 |
| Pigment content in PC | 18.0 | 16.0 | 40.0 |
| % Pigment in the clear varnish | 0.8 | 3.0 | 6.0 |

| | 1K Systems Synthalat E 405 | | |
|---|---|---|---|
| Item | Spezial-schwarz 4 | Heliogen Blue 7101F | Bayferrox Yellow 3910 |
| 1 Clear varnish | 19.1 | 16.3 | 17.0 |
| 2 Pigment concentrate | 0.9 | 3.8 | 3.0 |
| Total | 20.0 | 20.0 | 20.0 |

| | 2K Systems Desmophen 1300/Desmodur HL 60 BA | | |
|---|---|---|---|
| Item | Spezial-schwarz 4 | Heliogen Blue 7101F | Bayferrox Yellow 3910 |
| 1 Part A = base varnish | 12.7 | 10.8 | 11.3 |
| 2 Pigment concentrate | 0.9 | 3.8 | 3.0 |
| 3 Part B = curing component | 6.4 | 5.4 | 5.7 |
| Total | 20.0 | 20.0 | 20.0 |

Formulation 4: 2K PU Desmophen 1300 BA, 75% in BAC, Glossy

Procedure:

To produce the clear varnish, a premix is prepared from butyl acetate, MIBK, MEK, and Dowanol PMA. After that, NC chips (E510 ESO), Desmophen 1300BA, Desmophen 1300BA and BYK-066 are incorporated in succession with stirring and the mixture is then homogenized with a DISPERMAT LC3 at 2000 rpm in 3 minutes.

| Raw materials | Weight in % |
|---|---|
| Butyl acetate | 15.7 |
| MIBK (Methyl isobutyl ketone) | 10.7 |
| MEK (Methyl ethyl ketone) | 17.2 |
| Dowanol PMA (1-Methoxy-2-propyl acetate) | 12.3 |
| NC chips (E510 ESO) | 4 |
| Desmophen 1300BA | 40 |
| Desmophen 1300BA | 0.1 |
| BYK-066N | 0.3 |
| Total | 100 |

Curing Solution:

| Desmodur HL 60 BA | 30 |
|---|---|
| Dowanol PMA | 7 |
| Butyl acetate | 13 |
| Total | 50 |

Curing solution 2:1 (base varnish:curing agent)

Formulation 5: 1K NC System: Synthalat E 405

Procedure:

To produce the clear varnish, a premix is prepared from butyl acetate, ethyl acetate, and xylene. After that, NC chips (E510 ESO), Synthalat E 405 BA, BYK-306 and BYK-052 are incorporated in succession with stirring and then the mixture is homogenized with a DISPERMAT LC3 at 2000 rpm for 3 minutes.

| Raw material | Weight in % |
|---|---|
| Butyl acetate | 23.6 |
| Ethyl acetate | 19.6 |
| Xylene | 18.5 |
| NC chips (E510 ESO) | 12 |
| Synthalat E 405 BA | 26 |
| BYK-306 | 0.1 |
| BYK-052 | 0.2 |
| Total | 100 |

Compatibility Tests:

For the compatibility tests, the mixture was introduced into a 10 ml roll-edge snap-lid glass container and homogenized on a shaker for 10 minutes. Incompatibility showed itself in the form of a slight turbidity.

| No. | Raw material | SC additive | Amount (g) 100% | Amount (g) 60% |
|---|---|---|---|---|
| 2 | Varnish | 90 parts | 4.5 | 4.2 |
| 3 | Additive | 10 parts | 0.5 | 0.8 |
| | Total | | 5.0 | 5.0 |

| Experiment number | Setal 209* | Synthalat 405 E | Desmophen 1300 |
|---|---|---|---|
| ACB3 | 1 | 2 | 2 |
| ACY2* | 1 | 1 | 1 |
| ACY3* | 2 | 1 | 2 |
| ACB4 | 2 | 1 | 2 |
| ACB4@mod | 1 | 1 | 1 |

-continued

| | | | |
|---|---|---|---|
| ACB13 | 1 | 1 | 1 |
| ACY4* | 1 | 2 | 2 |

1 = compatible,
2 = slight incompatibility

Results:

| | Setal 209 | | Desmophen 1300 | | Synthalat 405 E | |
|---|---|---|---|---|---|---|
| | Visc. (mPas*s) | Visc. (mPas*s) | | | | |
| Additive | 1 day of storage at RT, γ = 10 1/s | 7 days of storage at RT, γ = 10 1/s | Gloss [20°] | Color strength/ Transparency [1-5] | Gloss [20°] | Color strength/ Transparency [1-5] |
| Heliogen Blue L7101F | | | | | | |
| ACY2* | 1400 | 1600 | 91 | 2 | 3 | 83 |
| ACB3 | 1200 | 1200 | 93 | 1 | 1 | 85 |
| ACY3* | 1400 | 1600 | 90 | 3 | 2 | 83 |
| ACB4 | 1200 | 1400 | 93 | 2 | 1 | 85 |
| ACB4@mod | 900 | 1200 | 92 | 1 | 1 | 84 |
| Bayferrox 3910 | | | | | | |
| ACY2* | 700 | 1700 | 88 | 3 | 3 | 82 |
| ACB3 | 400 | 500 | 90 | 2 | 3 | 84 |
| ACY3* | 1000 | 700 | 87 | 3 | 3 | 82 |
| ACB4 | 400 | 500 | 90 | 2 | 3 | 83 |
| ACB4@mod | 400 | 300 | 90 | 2 | 3 | 83 |
| ACB13 | 300 | 500 | 88 | 2 | 1 | 80 |
| ACY4* | 700 | 800 | 85 | 2 | 2 | 77 |

Spezialschwarz 4

System

| | Setal 209 | | Desmophen 1300 | | Synthalat 405 E | |
|---|---|---|---|---|---|---|
| | Visc. (mPas*s) | Visc. (mPas*s) | | | | |
| Additive | 1 day of storage at RT, γ = 10 1/s | 7 days of storage at RT, γ = 10 1/s | Gloss [20°] | Color strength/ Transparency [1-5] | Gloss [20°] | Color strength/ Transparency [1-5] |
| ACY2* | 400 | 500 | 96 | 1 | 4 | 87 |
| ACB3 | 300 | 400 | 97 | 1 | 2 | 88 |
| ACY3* | 500 | 600 | 96 | 2 | 1 | 87 |
| ACB4 | 400 | 500 | 97 | 1 | 1 | 87 |
| ACB4@mod | 400 | 500 | 97 | 1 | 1 | 87 |

Color strength + Transparency: 1-5 (1 = good, 5 = poor)

Summary of the Tests in Wood Varnish Systems:

The particularly good quality of the inventive polymers was evident in terms of the low viscosity, the color strength, transparency, and the good gloss.

Another particular advantage of the polymers lies in the particularly good compatibility in the binder solutions and, accordingly, simple incorporation.

Performance Testing of the Viscosity Reduction in UV Systems with Silica Fillers In the use examples below, the use of the inventively employed dispersants was tested in comparison to dispersants which can be used noninventively (labeled *), as additives for the stabilization of silica in corresponding wood varnish systems. The viscosity measurements here were made directly after dispersion and after storage at room temperature and in an oven at 50° C. The viscosity measurements were carried out using a Stresstech rheometer, ATS RheoSystems, at 23° C. The measurement in this case was repeated four times for 1, 10 and 100 1/s.

Test Systems:
Ebecryl 4381, unsaturated polyester, Allnex
Acematt HK 440, untreated silica, Acematt
Apparatus:
Stresstech rheometer, ATS RheoSystems
Micro-TRIgloss (BYK-Gardner)

Procedure:

For producing the varnish, a premix is prepared from binder, DPGDA (dipropylene glycol diacrylate), photoinitiator (photoinitiator). Thereafter the additives and silica are incorporated in succession with stirring (setting 1, Pendraulik) and then dispersed for 10 minutes with the Pendraulik on setting 4 (3730 rpm). The following levels of addition were selected:

5% solid additive based on pigment, Acematt HK 440
Pigment/binder ratio Ebecryl 4381=1:2.6.
Formulation 5: Ebecryl 4381

| Ebecryl 4381 | | |
|---|---|---|
| Sequence | Raw material | Amount (g) |
| 1 | Binder (Ebecryl 4381) | 38.70 |
| 2 | DPGDA | 39.55 |

-continued

| Ebecryl 4381 | | |
|---|---|---|
| Sequence | Raw material | Amount (g) |
| 3 | Darocure 1173 | 5.5 |
| 4 | Additive | 1.25 |
| 5 | Acematt HK 440 | 15 |
| | Total | 100.00 |

Results:

| Acematt HK 440 in Ebecryl 4381 | | | | | | | | | |
|---|---|---|---|---|---|---|---|---|---|
| | Visc. (Pas*s) 1 day's storage at RT | | | Visc. (Pas*s) 7 days' storage at RT | | | Visc. (Pas*s) 7 days' storage at 50° C. | | |
| Additive | γ = 1 1/s | γ = 10 1/s | γ = 100 1/s | γ = 1 1/s | γ = 10 1/s | γ = 100 1/s | γ = 1 1/s | γ = 10 1/s | γ = 100 1/s |
| ACY2* | 11 | 3 | 2 | 29 | 4 | 2 | 40 | 4 | 2 |
| ACB3 | 7 | 3 | 1 | 21 | 3 | 2 | 32 | 6 | 1 |
| ACY3* | 11 | 4 | 2 | 33 | 3 | 2 | 44 | 3 | 2 |
| ACB4 | 9 | 3 | 1 | 22 | 3 | 2 | 40 | 7 | 2 |
| ACB13 | 15 | 3 | 1 | 19 | 4 | 1 | 40 | 4 | 1 |
| ACY4* | 18 | 4 | 2 | 20 | 5 | 3 | 45 | 6 | 2 |

The gloss values were determined after application to black Plexiglas plaques measuring 20×10 cm. The drawdown was made using a 25 µm wire-wound bar.

| Ebecryl 4381 Acematt HK 440 | |
|---|---|
| Additives | Gloss [85°] |
| ACY2* | 55 |
| ACB3 | 61 |
| ACY3* | 57 |
| ACB4 | 61 |
| ACB13 | 60 |
| ACY4* | 57 |

Verification of the Incorporation of Matting Agents into Varnishes

Procedure:

1. Production of base coat (see formulation)
2. Addition of wetting & dispersing additive
3. Scattered incorporating of the matting agent up to the point at which the varnish was no longer stirrable, owing to a sharp increase in viscosity.

Formulation: Base Coat

| Base Coat | | |
|---|---|---|
| Ebecryl 4381 | 38.70 | Addition: |
| BYK-350 | 0.20 | individually |
| BYK-088 | 0.40 | stirring for 5 min |
| BYK-306 | 0.20 | at 2000 rpm |
| Irgacure 1173 | 5.50 | |
| DPGDA | 55.00 | |
| Total | 100.0 | |

Results:

| Additive | Addition in % |
|---|---|
| ACY2* | 18 |
| ACY3* | 18 |
| ACY4* | 17 |
| ACB3 | 21 |
| ACB4 | 22 |
| ABC13 | 21 |

Summary of the Viscosity Testing in UV Systems

The particularly good quality of the inventive polymers is apparent in relation to the low viscosity and a high degree of dulling. With the inventive polymers it is possible to achieve effective viscosity reduction in highly filled systems. The addition of inventive polymers achieves the maximum quantity of added matting agent.

The invention claimed is:

1. A process for preparing an amine adduct, comprising reacting in a 1st step a polyamine (A) with a monomer (C), monomer (C) comprising one or more of an epoxide, an oxetane or a cyclic carbonate to form an intermediate product (AC) and reacting intermediate product (AC) in a subsequent 2nd step with a monomer (B), monomer (B) comprising one or more of a lactone, an acyclic hydroxy-carboxylic acid or a hydroxy-functional acyclic ester, to form a downstream product (ACB), wherein the polyamine (A) has in each case at least three amino groups (A+) which are selected from primary and secondary amino groups and which in each case are reactive with the monomers (C) and (B), the monomer (C) contains no ester groups, no carboxyl groups, and no primary or secondary amino groups, and in the 1st step reacts with ring opening and also formation of a hydroxyl group (H+) with one of the amino groups (A+) of the polyamine (A), with additional formation of either a carbon-nitrogen bond or a urethane bond, the monomer (B) contains no primary or secondary amino groups, has a molecular weight of 90-300 g/mol, and reacts in the 2nd step in such a way that any amino groups (A+) unreacted in the 1st step are converted into amide groups, and hydroxyl groups (H+) formed in the 1st step are converted into ester groups, wherein the monomer (B) is selected such that either reaction thereof is accompanied by additional formation of a terminal hydroxyl group (H++) or that the monomer (B) itself already possesses a terminal hydroxyl group (H++) and that via the terminal hydroxyl groups (H++), with formation of (poly)ester groups, there is further adduction of the monomer (B), wherein the process parameters are selected such that in the 1st step and in the 2nd step in total at least 50 mol % of the amino groups (A+) are converted.

2. The process as claimed in claim 1, wherein the monomer (C) is in the form of an epoxide, and wherein in the 1st step the monomer (C), with ring opening and with formation of a hydroxyl group (H+), reacts with one of the amino groups (A+) of the polyamine (A), with additional formation of a carbon-nitrogen bond.

3. The process as claimed in claim 1, wherein the monomer (C) has exclusively the elements carbon, hydrogen, and oxygen, and contains no hydroxyl groups.

4. The process as claimed in claim 1, wherein the monomer (C) has a maximum of three oxygen atoms and 6 to 70 carbon atoms.

5. The process as claimed in claim 1, wherein the monomer (B) is present in the form of a lactone.

6. The process as claimed in claim 1, wherein the polyamine (A) is used in relation to the monomer (C) in a weight ratio of 1:0.1 to 1:100.

7. The process as claimed in claim 1, wherein monomer (B) is used relative to monomer (C) in a molar ratio such that after the end of the 2nd step a maximum of 5% of the hydroxyl groups present in the downstream product (ACB) are present in the form of hydroxyl groups (H+) formed in the 1st step.

8. The process as claimed in any of claim 1 wherein the monomer (B) is used in relation to the monomer (C) in a molar ratio of 500:1 to 1:1.

9. The process as claimed in claim 1 wherein the process parameters are selected such that at least 50 mol % of the amino groups (A+) are already converted by the 1st step and a total of at least 70 mol % of the amino groups (A+) are converted by the 1st and 2nd steps.

10. The process as claimed in claim 1, wherein predominantly or exclusively the only reaction components used are polyamine (A), monomer (C), and monomer (B), so that the downstream product (ACB), based on its own mass, contains a total of at least 80 wt % of structural elements from the group of reacted polyamine (A), reacted monomer (C) and reacted monomer (B).

11. The process as claimed in claim 1 wherein the 1st step and the 2nd step are carried out in each case at temperatures below 175° C.

12. The process as claimed in claim 1 further comprising reacting the downstream product (ACB) with an acid comprising one or more of an aliphatic, cycloaliphatic and/or aromatic monocarboxylic acids each containing 1-30 carbon atoms in such a way as to form a downstream product (ACB) modified by salt formation and/or ester formation.

13. The process as claimed claim 1 further comprising neutralizing the downstream product (ACB) with one or more organic or inorganic acids or by quaternization.

14. An amine adduct preparable by the process as claimed in claim 1.

15. A paint and/or plastic comprising an amine adduct preparable by the process as claimed in claim 1.

16. The process as claimed in claim 4, wherein the monomer (C) has precisely one oxygen atom and 6 to 32 carbon atoms.

17. The process as claimed in claim 5, wherein the monomer (B) comprises one or more of caprolactone, valerolactone or butyrolactone.

18. The process as claimed in claim 7, wherein monomer (B) is used relative to monomer (C) in a molar ratio such that after the end of the 2nd step a maximum of 1% of the hydroxyl groups present in the downstream product (ACB) are present in the form of hydroxyl groups (H+) formed in the 1st step.

19. The process as claimed in claim 10, wherein the downstream product (ACB), based on its own mass, contains a total of at least 95 wt % of structural elements from the group of reacted polyamine (A), reacted monomer (C) and reacted monomer (B).

* * * * *